United States Patent [19]

Eguchi et al.

[11] Patent Number: 4,778,777
[45] Date of Patent: Oct. 18, 1988

[54] CHEMICALLY DURABLE POROUS GLASS AND PROCESS FOR THE MANUFACTURE THEREOF

[75] Inventors: Kiyohisa Eguchi; Hiroshi Tanaka, both of Kawanishi; Tetsuo Yazawa, Ikeda; Takao Yamaguro, Wada, all of Japan

[73] Assignee: Agency of Industrial Science & Technology, Tokyo, Japan

[21] Appl. No.: 917,561

[22] Filed: Oct. 10, 1986

[30] Foreign Application Priority Data

Oct. 14, 1985 [JP] Japan ................................. 60-229079

[51] Int. Cl.$^4$ .......................... C03C 11/00; C03C 3/06; C03C 3/089; C03C 3/093
[52] U.S. Cl. .................................... 501/39; 501/54; 501/65; 501/67
[58] Field of Search ................ 501/32, 39, 54, 65, 501/67

[56] References Cited

U.S. PATENT DOCUMENTS

| | | | |
|---|---|---|---|
| 3,881,944 | 5/1975 | Beall et al. | 501/39 |
| 3,923,533 | 12/1975 | Hammel et al. | 501/39 |
| 4,366,253 | 12/1982 | Yagi | 501/39 |
| 4,376,835 | 3/1983 | Schmitt et al. | 501/39 |
| 4,665,039 | 5/1987 | Kokubu et al. | 501/39 |

*Primary Examiner*—Mark L. Bell
*Attorney, Agent, or Firm*—Armstrong, Nikaido, Marmelstein & Kubovcik

[57] ABSTRACT

A chemically durable porous glass of which the skeleton mainly comprises $SiO_2$-$ZrO_2$ system glass having a $ZrO_2$ content of 2 or more wt %, and a process for the production of such glass.

11 Claims, 2 Drawing Sheets

CHEMICALLY DURABLE POROUS GLASS AND PROCESS FOR THE MANUFACTURE THEREOF

BACKGROUND

The present invention relates to chemically durable porous glass and a process for the manufacture thereof. More particularly, the invention relates to novel chemically durable porous glass useful for various separating media or membranes or as filling material for use in gel permeation chromatography, and also to a process for the manufacture thereof by a phase separation method.

With reference to U.S. Pat. Nos. 2,106,774 and 3,843,341 for example, thereby it is known to produce porous glass by heat treating at a temperature of 500° to 650° C. borosilicate glass mainly comprising silicic acid, boric acid, alumina and alkali substances to cause to occur a phase separation between a phase mainly comprising $SiO_2$ and a phase mainly comprising $B_2O_3$, and then by selectively eluting the latter phase with a mineral acid.

However, the porous glasses produced by such method have a skeleton mainly comprising $SiO_2$ and are therefore poor in the waterproof property and the resistivity to alkali, and cannot be suitably employed for use in contact with water or alkali.

Also, during the phase separation, some amount of $SiO_2$ tends to mingle into the $B_2O_3$ phase and, after the $B_2O_3$ phase has been eluted with a mineral acid, remains present in fine pores in the form of gel, which has to be removed by washing with alkali. However, it then is likely that $SiO_2$ is also dissolved out, so that it is infeasible to effect a sufficient washing with alkali and obtain porous glass having a large volume of fine pores.

It is also known to produce heat and alkali durable porous glass mainly comprising an oxide of a rare earth element with use of a material glass of $B_2O_3$-$Na_2O$ system glass-forming ingredients to which is added an oxide of a rare earth element and by operating a phase separation of the material glass, followed by eluting the $B_2O_3$ phase with hot water [e.g., Journal of the American Chemical Society, 66, 221, (1983)].

However, this known process is not generally employable in that it requires using a particular material of an oxide of a rare earth element, and involves a disadvantage such that the size of pores in porous glass then obtainable is only so small as to be less than 200 angstrom.

Besides the above recited known processes, reportedly there have been attempts made to produce alkali durable porous glass by adding $ZrO_2$ to a material glass, $ZrO_2$ being usually blended as ingredient for imparting an alkali durability to glass. However, $ZrO_2$ undergoes transfer into the soluble phase during the phase separation and becomes removed through a subsequently operated elution treatment with an acid, so that such attempts have not been successful.

SUMMARY

Accordingly, a primary object of the present invention is to remove the shortcomings and inconveniences above indicated in connection with porous glass of the prior art and provide novel porous glass which contains none or, if any, little of gel substances remaining present in its fine pores and which has a large volume of fine pores.

It also is a primary object of the invention to provide a process for the manufacture of such novel porous glass which can effectively make use of a conventionally widely used material and can be carried out without any complex operation.

The Drawings

THE PREFERRED EMBODIMENTS

Figure 1:
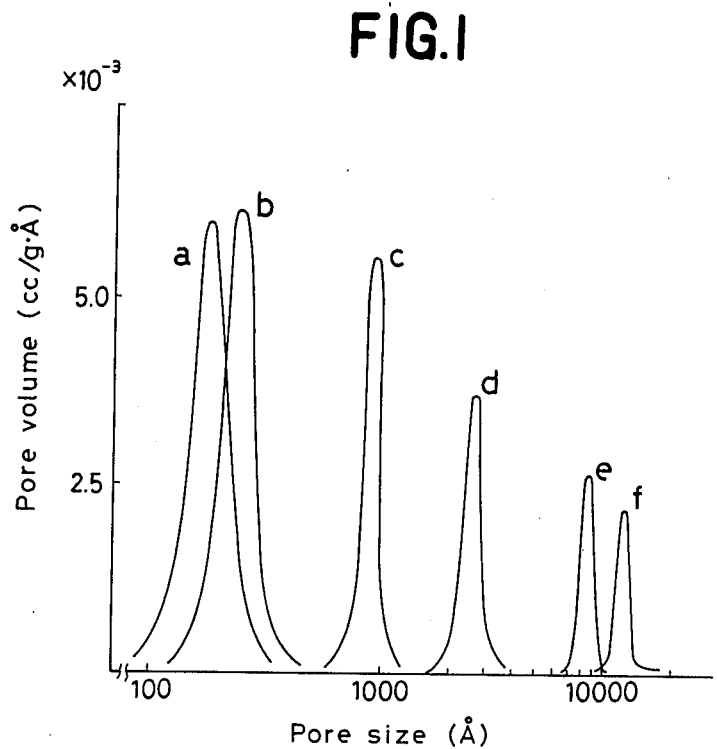
FIG. 1 is a view, showing the distribution of fine pores in the porous glass produced in Example 1 later to be described of the present invention.

The present invention has been made, based on the knowledge the present inventors have acquired that if, in adding $ZrO_2$ to a material glass mainly comprising $SiO_2$ and $B_2O_3$, a certain limited amount of an alkaline earth metal oxide is made also present, then unexpectedly the $ZrO_2$ is selectively transferred, during the phase separation, into the phase mainly comprising $SiO_2$ and little $ZrO_2$ remains present in the soluble phase mainly comprising $B_2O_3$, and that such a glass is then obtainable of which the skeleton is composed of alkali durable $SiO_2$-$ZrO_2$ components, which is not adversely affected through washing with alkali, so that it is feasible to completely remove gel substances from the glass.

Thus, with the novel chemically durable porous glass according to the present invention, the skeleton thereof comprises $SiO_2$-$ZrO_2$ system glass containing 2 wt. % or more of $ZrO_2$.

If the content of $ZrO_2$ does not reach 2 wt. %, then it is infeasible to obtain a sufficient alkali durability.

Although no particular upper limitation is applicable to this, the $ZrO_2$ content should preferably be 40 wt. % at the greatest. If the $ZrO_2$ content in the material substance is excessively great, a crystallization is likely to occur during the preparation of a material glass by dissolving the material substance or composition, when the formation of product glass becomes hardly operable, so that the $ZrO_2$ content in the material composition should preferably be so limited as to be 20 wt. % at the greatest so that the $ZrO_2$ content in the product porous glass can be kept at 40 wt. % at the greatest.

The porous glass according to the invention may normally contain, besides $SiO_2$ and $B_2O_3$, such components as an alkaline earth metal oxide, $Al_2O_3$ and alkali metal oxides derived from the ingredients in the material glass, and other impurity matters which may occasionally unavoidably become mingled, such as $Fe_2O_3$, $TiO_2$, ZnO, MnO, $CaF_2$, $CeO_2$, $SnO_2$ and so forth, but it may not always be necessary to remove those additional components or impurity matters away insofar as they do not essentially affect the characteristics of the porous glass adversely.

According to the process of the invention, the porous glass is manufactured as follows:

Initially the preparation is made of a material composition containing 40 to 75 wt. % of $SiO_2$, 15 to 40 wt. % of $B_2O_3$, 4 to 20 wt. % of $ZrO_2$ and 5 to 30 wt. % of an alkali earth metal oxide or 5 to 30 wt. % of ZnO, and this material composition is melted by heating at a temperature of 1200° to 1500° C. to obtain a material glass.

For the alkaline earth metal oxide, use may be made of CaO, BaO and MgO, which may be used either singly or in the form of a mixture.

The alkaline earth metal oxide or ZnO is used according to the present invention in order to cause the $ZrO_2$ present at the time of the phase separation to be transferred into the phase mainly comprising $SiO_2$. Without use of this ingredient, $ZrO_2$ is in the soluble phase and, upon elution with an acid, becomes removed away, when it no longer is feasible to obtain a desirable chemically durable porous glass.

With a blending amount of the alkaline earth metal oxide or ZnO less than 5 wt. %, it is not possible to satisfactorily transfer $ZrO_2$ into the phase mainly comprising $SiO_2$ through the phase separation, and with a blending amount exceeding 30 wt. %, although no change takes place in the effect of transferring $ZrO_2$ into the phase mainly comprising $SiO_2$ through the phase separation, the change in the viscosity of the material glass in proportion to a change in temperature becomes promoted to make the glass formation hardly operable.

The amount of the alkaiine earth metal oxide or ZnO to be blended depends to some extent on the amount of $ZrO_2$, and it should normally be at least 1 in the molar ratio to the amount of $ZrO_2$ to be contained in the $SiO_2$ phase.

The material composition for the preparation of the material glass may contain, in addition to the above indispensable ingredients other ingredients, such as $Al_2O_3$ and an alkali metal oxide such as $K_2O$, $Na_2O$ and so forth.

With $Al_2O_3$, a portion thereof may eventually be left present in the phase comprising $SiO_2$ and $ZrO_2$, so that it may act to promote the action of $ZrO_2$ to impart chemical durability to glass. If added in an excessive amount, $Al_2O_3$ tends to raise the melting temperature of the material glass, so that its amount should be 5 wt. % at the greatest, based on the whole weight of the composition.

An additive use of an alkali metal oxide may be made to prevent loss of transparency during preparation of the material glass and also to lower the melting temperature to enhance processability. If this oxide is added in an excessive amount, however, the desirable characteristics of the $SiO_2$-$ZrO_2$ system glass will be lost, so that the amount to be added of the oxide should be 20 wt. % at the greatest, based on the whole weight of the composition.

The material composition may further include, in addition to the above recited ingredients, such substances as may normally be added in glass and/or such impurity matters as being inevitably derived from components of the material, providing that the content thereof is limited to such a one as not adversely affecting the transfer of $ZrO_2$ into the phase mainly comprising $SiO_2$ and the elution with an acid of the phase mainly comprising $B_2O_3$. Such additional components or impurity substances may for example be $Fe_2O_3$, $TiO_2$, ZnO, MnO, $CaF_2$, $CeO_2$, $SnO_2$ and so forth.

As before stated, the material composition is melted at a temperature of 1200° to 1500° C. to prepare a material glass.

The time required for the preparation of the material glass is normally several hours, and the material glass prepared is processed by known methods at a temperature within a range of 800° to 1100° C. to the prescribed shape such as for example a tube, plate, sheet, sphere or ball and so forth.

The shaped glass will then be subjected to a heat treatment at a temperature within a range of 500° to 800° C. for 2 to 100 hours, when a phase separation takes place between a phase mainly comprising $SiO_2$ and $ZrO_2$ and a phase mainly comprising $B_2O_3$ and there becomes formed a structure in which such two phases co-exist.

By the herein termed heat treatment, it is meant to heat the shaped glass at a temperature within the above recited range in an electric furnace or an atmosphere furnace.

According to the present invention, the temperature and the time for the heat treatment for causing the phase separation to occur are selectively varied within the prescribed ranges, whereby it is feasible to adjust the pore size or diameter in the porous glass to be produced. Generally, the size of fine pores in the final product porous glass tends to be greater as the temperature for the heat treatment is higher, so that where a smaller pore size is desired, the heat treatment may be operated at a suppressed temperature, while it may be operated at a higher temperature if a larger pore size is desirable. Further, the fine pore size in porous glass increases in proportion to an increase in the treating time, in a manner of an exponential function.

The phase mainly comprising $SiO_2$ and $ZrO_2$ formed through the phase separation treatment is insoluble in or with acid, while the other phase mainly comprising $B_2O_3$ is acid soluble, so that the shaped or molded glass subjected to the phase separation treatment may be immersed in an acid to dissolve and remove the latter phase and to then obtain a porous glass.

The acid for use for or in the present invention may preferably be an inorganic acid such as hydrochloric acid, nitric acid, sulfuric acid and phosphoric acid, but it also is possible to use an organic acid such as oxalic acid, acetic acid, succinic acid and citric acid. Normally, the acid is used in the form of a 0.2 to 5N aqueous solution.

The treatment with such acid is operated by immersing the shaped glass in an aqueous solution of the acid heated to 90° to 100° C., normally for several hours to 100 hours.

The porous glass produced as above include in the fine pores thereof gel substances generated during the elution with the acid such as zirconia gel, silica gel and alumina gel, and these gel substances are removed away by operating a washing treatment.

Removal of the gel substances may be processed in a manner of initially removing the zirconia gel with an acid, and then removing the silica gel and alumina gel with an aqueous alkali solution.

The acid for use for or in the removal of gel substances may be an inorganic acid such as 1 to 5N sulfuric acid and hydrochloric acid, heated to 50° to 100° C. and, for the aqueous alkali solution, use may be made of 0.1 to 5N aqueous caustic alkali solution, heated to 0° to 50° C.

The time required for the removal of gel substances may vary depending on the temperature for the treatment, but it normally is about 5 to 50 hours.

While by the treatment to be operated as above the gel substances in fine pores can be completely removed, the $SiO_2$-$ZrO_2$ system glass forming the skeleton is acid durable and alkali durable, and does not undergo any change through the treatment, so that it is possible to obtain a porous glass having a large volume of fine pores.

As described above, the porous glass according to the present invention has a remarkable durability or resistivity against chemicals such as acids and alkali and a large volume of fine pores, and it has substantially no gel substances remaining present in its fine pores and can exhibit a remarkable permeability toward gas and liquids, so that it is widely useful as material for various separating membranes or filling material for use in gel permeation chromatography, for which the porous glass of the prior art cannot be effectively or satisfactorily utilized.

Also, according to the present invention it is feasible to produce porous glass having a size or diameter of pores as desired by suitably selectively setting the temperature for the phase separation treatment, whereby as a further advantage of the invention, the possibility can be provided to produce such separating membranes or absorption media of which the pore size is suitably adapted to particular substances to be subjected to separation or absorption.

Now, the present invention will be described in further detail in conjunction with Examples thereof and a Comparative Example.

EXAMPLE 1

A material composition comprising 53.5 wt. % of $SiO_2$, 23.0 wt. % of $B_2O_3$, 8.0 wt. % of CaO, 6.0 wt. % of $ZrO_2$, 4.5 wt. % of $Na_2O$, 2.0 wt. % of $K_2O$ and 3.0 wt. % of $Al_2O_3$ was melted at 1400° C. for 3 hours to prepare material glass, which was shaped to a tube of 1 mm in thickness and 10 mm in outer diameter by a manual drawing.

The tube was cut to pieces of 10 cm in length to provide samples a to f, which were respectively subjected to a phase separation by a heat treatment for 4 hours at different respective temperatures within the range of 625° to 740° C. as recited in Table 1 and were then immersed in 1N nitric acid maintained at 90° C. for 100 hours to elute the soluble portion. Porous glass samples thus obtained were immersed initially in 3N sulfuric acid maintained at 100° C. for 24 hours and then in 0.5N aqueous caustic soda solution maintained at 0° C. to completely remove gel substances in fine pores in the glass samples.

TABLE 1

| Sample | a | b | c | d | e | f |
| --- | --- | --- | --- | --- | --- | --- |
| Temperature (°C.) | 625 | 650 | 675 | 700 | 725 | 740 |

Of each of the above obtained and treated porous glass samples, the distribution of fine pores was determined, and the results of the determination are illustrated in FIG. 1 of the accompanying drawings.

Also an analysis of ingredients or components was conducted of samples a and c with the results in the following Table 2.

TABLE 2

|  | a | c |
| --- | --- | --- |
| $SiO_2$ | 89.9 | 86.2 |
| $B_2O_3$ | 0.3 | 0.9 |
| CaO | 0.1 | 0.9 |
| $ZrO_2$ | 7.0 | 5.7 |
| $Na_2O$ | 0.1 | 1.2 |
| $K_2O$ | 0.0 | 0.1 |

TABLE 2-continued

|  | a | c |
| --- | --- | --- |
| $Al_2O_3$ | 2.6 | 5.0 |

EXAMPLE 2

A material composition comprising 49.2 wt. % of $SiO_2$, 24.6 wt. % of $B_2O_3$, 14.7 wt. % of $ZrO_2$, 6.9 wt. % of CaO and 4.6 wt. % of $Na_2O$ was melted and shaped same as in the above Example 1 to prepare material glass, which was subjected to a phase separation by a heat treatment at 700° C. for 24 hours. Then, in same manners as in Example 1, the soluble phase was eluted with nitric acid, and gel substances separated out in the fine pores were removed by washing with sulfuric acid and aqueous caustic soda solution.

The porous glass thus obtained had a composition comprising 83.2 wt. % of $SiO_2$, 15.1 wt. % of $ZrO_2$, 0.2 wt. % of CaO, 0.4 wt. % of $Na_2O$ and 1.1 wt. % of $B_2O_3$ and an average pore size of $0.1\mu$.

EXAMPLE 3

A material composition comprising 47.0 wt. % of $SiO_2$, 25.0 wt. % of $B_2O_3$, 5.0 wt. % of $Na_2O$, 10.0 wt. % of CaO and 10.0 wt. % of $ZrO_2$ was melted and shaped as in Example 1 to prepare a material glass, which was subjected to a phase separation by heat treatment at 650° C. for 24 hours, and in same manners as in Example 1, the soluble phase was then eluted with nitric acid, followed further by removal of the gel substances separated out in fine pores by washing with sulfuric acid and then with aqueous caustic soda solution.

The porous glass thus obtained had a composition comprising 89.4 wt. % of $SiO_2$, 9.2 wt. % of $ZrO_2$, 1.1 wt. % of $B_2O_3$, 0.1 wt. % of $Na_2O$ and 0.2 wt. % of CaO and an average pore diameter of $0.01\mu$.

COMPARATIVE EXAMPLE

The material composition of Example 1 except that the 8.0 wt. % of CaO therein was wholly replaced by $Na_2O$ was melted at 1300° C. for 3 hours to prepare a material glass. After it was shaped as in Example 1, this material glass was subjected to a phase separation by a heat treatment at 675° C. for 24 hours, and the soluble phase was eluted by immersion in 1N nitric acid maintained at 100° C. for 100 hours, followed by washing with 3 N sulfuric acid and then with 0.5N aqueous caustic soda solution, to obtain porous glass of an average pore diameter of $0.01\mu$. The porous glass had a composition comprising 94.5 wt. % of $SiO_2$, 4.0 wt. % of $B_2O_3$, 0.8 wt. % of $ZrO_2$, less than 0.1 wt. % of $Na_2O$, less than 0.1 wt. % of $K_2O$ and 0.5 wt. % of $Al_2O_3$.

As clearly seen from this instance, when no alkali earth metal oxide is made present in the material glass, $ZrO_2$ was almost wholly transferred into the soluble phase, removed and was not contained in the skeleton.

EXAMPLE 4

Figure 2:
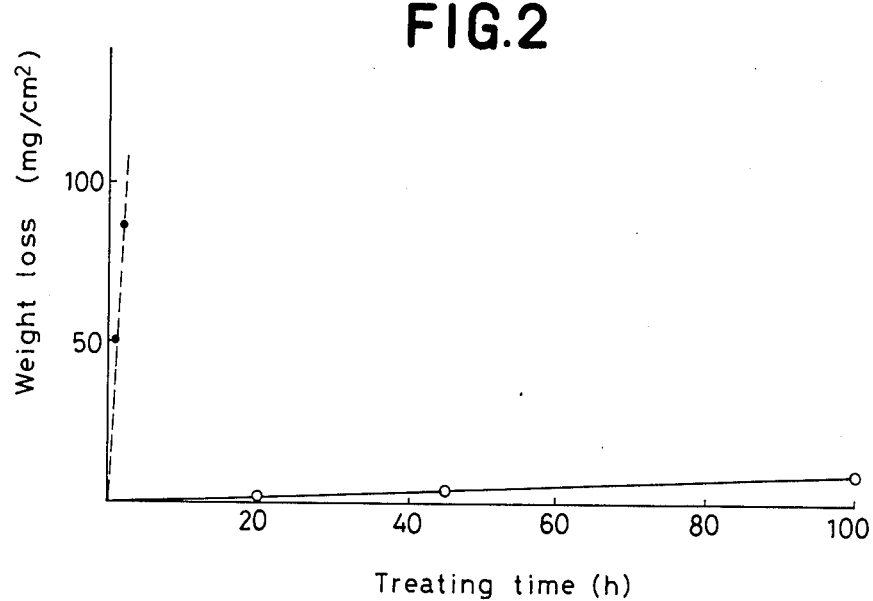
FIG. 2 is a view, taken to show changes in weight with the lapse of time in an aqueous solution of alkali, of a porous glass according to the present invention and of a porous glass of the prior art.

The glass sample a obtained in Example 1 was immersed in 1N aqueous caustic soda solution maintained at 30° C. and the reduction of its weight with the lapse of time was determined to obtain results as shown by solid lines in FIG. 2 of the accompanying drawings, which also enters a broken line representation, showing the results of a comparable determination made, by way of comparison, of a Vycor-type porous glass according to the prior art.

As clearly seen from the graphic showing in FIG. 2, the porous glass according to the present invention has remarkably exceeding alkali durability in comparison to porous glass of the prior art.

EXAMPLE 5

Figure 3:
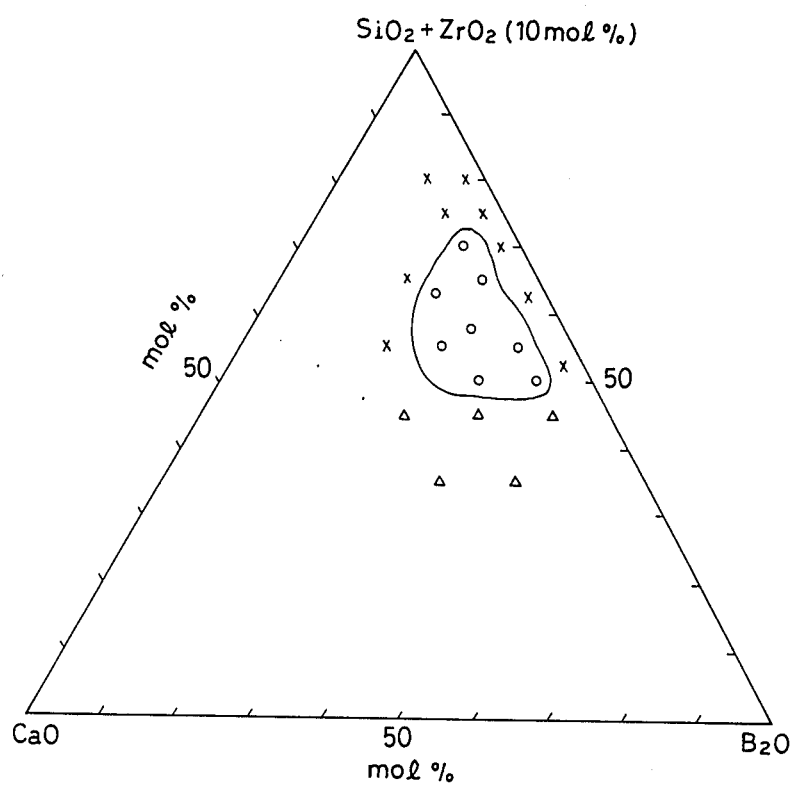
FIG. 3 is a view, taken for illustration of the relationship between the composition of material substances and the product porous glass, according to the invention.

Prepared were material compositions of the 22 different compositions shown in FIG. 3 by symbols X, x, and Δ, each of which was melted at a temperature of 1300° to 1450° C. for 30 minutes to 1 hours to prepare material glass, which were shaped into sheets.

Each glass sheet was then subjected to a phase separation by a heat treatment at 700° C. for 24 hours and was then ground to particles of a size of 500 to 800μ. After the soluble phase was then eluted through a treatment with 1N $HNO_3$ maintained at 98° C. for 24 hours, silica of a gel form was removed by treatment with 0.25N NaOH for 24 hours.

After the above treated glass particles were sufficiently washed with water and dried, the distribution of fine pores was determined by a pressurized mercury introduction method and a nitrogen absorption method to obtain results as illustrated in FIG. 3.

In FIG. 3, the symbol represents instances in which porous glass could be obtained, X representing instances where glassification did not take place through the melting step, Δ representing instances where gellation took place during the treatment with acid, and x representing instances where phase separation did not occur and porous glass could not be obtained.

Further, each of the material composition was added with and contained 6.5 mol % of $Na_2O$.

We claim:

1. A chemically durable porous glass having fine pores and a skeleton which is composed mainly of a $SiO_2$-$ZrO_2$ system glass having a $ZrO_2$ content of at least 2% by weight, said chemically durable porous glass being obtained by preparing a starting composition comipirisng 40 to 75 wt. % of $SiO_2$, 15 to 40 wt. % of $B_2O_3$, 4 to 20 wt. % of $ZrO_2$ and 5 to 30 wt. % of an oxide selected from the group consisting of an akaline earth metal oxide and ZnO; heating and melting said starting composition at a temperature of 1200° to 1500° C. to prepare a glass; heating and shaping said glass; subjecting the resulting shaped glass to a heat tretment at 500° to 800° C. to effect a phase separation between a phase mainly comprising $SiO_2$ and $ZrO_2$ and a phase mainly comprising $B_2O_3$ and then removing the latter phase by eluting with an acid; followed by removing by washing any gel substance present in the fine pores in the glass.

2. A chemically durable porous glass as in claim 1, wherein the $ZrO_2$ content of the chemically durable porous glass is at most 40%.

3. A chemically durable porous glass as in claim 1, which further contains an oxide selected from the group consisting of an alkaline earth metal oxide and ZnO, $Al_2O_3$, an alkali metal oxide and impurities.

4. A chemically durable porous glass as in claim 1, wherein the starting composition further comprises $Al_2O_3$.

5. A chemically durable porous glass as in claim 1, wherein the starting composition further comprises an alkali metal oxide.

6. A chemically durable porous glass as in claim 4, wherein the amount of $Al_2O_3$ is at most 5 wt. % based on the weight of the starting composition.

7. A chemically durable porous glass as in claim 5, wherein the amount of the alkali metal oxide is at most 20 wt. % based on the weight of the starting composition.

8. A chemically durable porous glass as in claim 1, wherein the heat treatment of the shaped glass is conducted for a period of 2-100 hours.

9. A chemically durable porous glass as in claim 1, wherein the elution of the phase mainly comprising $B_2O_3$ with an acid is conducted by immersing the shaped glass in an aqueous acid solution heated at 90°-100° C.

10. A chemically durable porous glass as in claim 1, wherein the gel substance is zirconia gel, which is removed by washing with an inorganic acid.

11. A chemically durable porous glass as in claim 1, wherein the gel substance is composed of silica gel and alumina gel, which are removed by washing with an aqueous alkali solution.

* * * * *